United States Patent
Farrell et al.

(10) Patent No.: US 10,164,831 B2
(45) Date of Patent: Dec. 25, 2018

(54) SELECTIVE SERVICE REDIRECTION FOR TELECOM SERVICE MIGRATION

(71) Applicant: International Business Machines Corporation, Armonk, NY (US)

(72) Inventors: Craig A. Farrell, San Diego, CA (US); Praduemn K. Goyal, Holmdel, NJ (US); Raju P. Kattady, Plano, TX (US); Sanjay B. Patel, Cary, NC (US); Kaushal A. Thakker, Gurgaon (IN)

(73) Assignee: International Business Machines Corporation, Armonk, NY (US)

( * ) Notice: Subject to any disclaimer, the term of this patent is extended or adjusted under 35 U.S.C. 154(b) by 329 days.

(21) Appl. No.: 15/184,123

(22) Filed: Jun. 16, 2016

(65) Prior Publication Data
US 2017/0366392 A1 Dec. 21, 2017

(51) Int. Cl.
*H04L 12/24* (2006.01)
*H04L 29/08* (2006.01)

(52) U.S. Cl.
CPC ........ *H04L 41/082* (2013.01); *H04L 41/0823* (2013.01); *H04L 67/10* (2013.01); *H04L 41/0873* (2013.01)

(58) Field of Classification Search
CPC .. G06F 17/30424; G06F 9/50; G06F 11/3051; H04W 24/04; H04L 41/0803; H04L 41/0866; H04L 41/0869; H04L 67/34; H04L 41/00; H04L 41/0853; H04L 41/082; H04L 41/0873; H04L 67/10
See application file for complete search history.

(56) References Cited

U.S. PATENT DOCUMENTS

| 2003/0074342 | A1* | 4/2003 | Curtis ............... G06Q 10/10 |
| 2004/0052343 | A1 | 3/2004 | Glaser et al. |
| 2005/0180390 | A1 | 8/2005 | Baruzzi et al. |
| 2006/0215632 | A1 | 9/2006 | Adams et al. |

(Continued)

OTHER PUBLICATIONS

P. Mell et al., "The NIST Definition of Cloud Computing", National Institute of Standards and Technology, Information Technology Laboratory, Sep. 2011, pp. 1-7.

*Primary Examiner* — Sargon N Nano
(74) *Attorney, Agent, or Firm* — Law Office of Jim Boice

(57) ABSTRACT

A method, system, and/or computer program product improves an operation of an enterprise network. One or more processors receive an electronic request for delivery of a legacy component to an enterprise network of an enterprise. The processor(s) determine whether an upgrade component is available to the enterprise to replace the legacy component in the enterprise network based on predetermined request throttling parameters set by a receiver of the electronic request. The processor(s), in response to determining that the upgrade component is available to the enterprise, query a hardware sensor in the enterprise network for a sensor reading that indicates whether the upgrade component is compatible with an architecture of the enterprise network. The processor(s), in response to determining that the sensor reading indicates that the upgrade component is compatible with the enterprise network, reconfigure the enterprise network by an electronic installation of the upgrade component into the enterprise network.

17 Claims, 7 Drawing Sheets

(56) References Cited

U.S. PATENT DOCUMENTS

| | | | |
|---|---|---|---|
| 2011/0282724 A1* | 11/2011 | Hwang | G06Q 30/02 705/14.19 |
| 2015/0135190 A1* | 5/2015 | Hameleers | H04L 67/125 718/104 |
| 2015/0372868 A1* | 12/2015 | Terwilliger | G06F 8/60 709/224 |

* cited by examiner

US 10,164,831 B2

SELECTIVE SERVICE REDIRECTION FOR TELECOM SERVICE MIGRATION

BACKGROUND

The present disclosure relates to the field of telecommunication systems, and specifically to services supplied by telecommunication systems. More specifically, the present disclosure relates to improving a telecommunication system through selectively updating resources used by the telecommunication system.

Many operators and service providers transform their legacy business services towards Internet Protocol (IP) based equivalent services, such as Voice over IP (VoIP). One method to move from legacy services to newer IP based services is the "cap and grow" approach. In cap and grow, a complete replacement service is built for a given legacy service and then a "cut over" occurs. At the cut-over, all orders for the old service are sent to the new service for fulfillment. This approach has a number of disadvantages, including the risk of having to build a new service that completely replaces the old service, including all of the special use cases, so that all calls/orders can be redirected to the new, replacement service. This strategy requires significant up front work and is generally a high risk.

SUMMARY

A method, system, and/or computer program product improves an operation and functionality of an enterprise network. One or more processors receive an electronic request for delivery of a legacy component to an enterprise network of an enterprise. The processor(s) determine whether an upgrade component is available to the enterprise, where the upgrade component is designed to replace the legacy component in the enterprise network, and where availability of the upgrade component is based on predetermined request throttling parameters set by a receiver of the electronic request. The processor(s), in response to determining that the upgrade component is available to the enterprise, query a hardware sensor in the enterprise network for a sensor reading, where the sensor reading indicates whether the upgrade component is compatible with an architecture of the enterprise network. The processor(s), in response to determining that the sensor reading indicates that the upgrade component is compatible with the enterprise network, reconfigure the enterprise network with the upgrade component by responding to the electronic request with an electronic installation of the upgrade component into the enterprise network.

DETAILED DESCRIPTION

Figure 1:
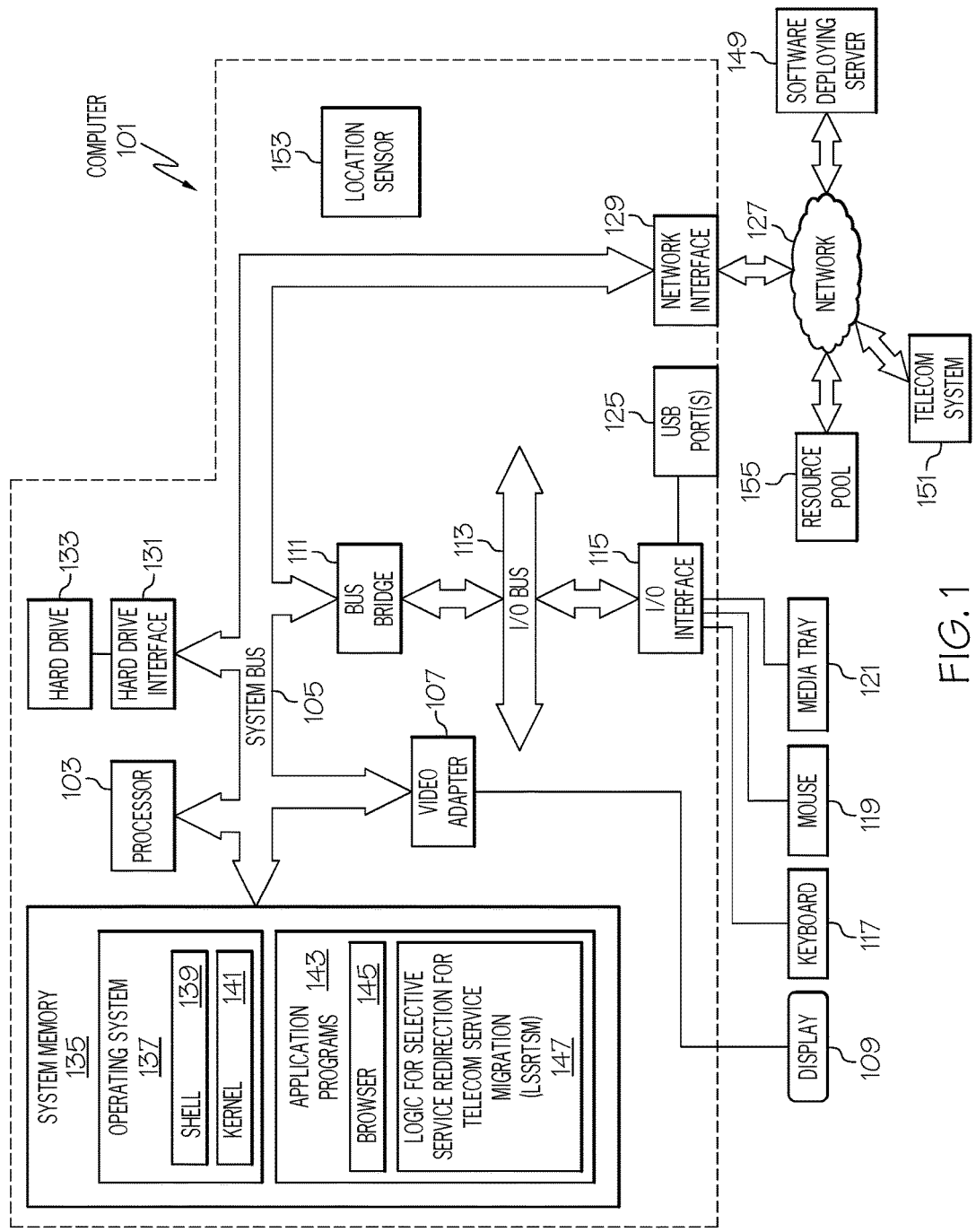
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or components in the telecom system 151 shown in FIG. 1, and/or the management system 201 and/or nodes 204a-204d and/or hardware sensor 208 shown in FIG. 2.

Exemplary computer 101 includes a processor 103 that is coupled to a system bus 105. Processor 103 may utilize one or more processors, each of which has one or more processor cores. A video adapter 107, which drives/supports a display 109 (which in one or more embodiments of the present invention is a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems such as telecom system 151 using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing.

While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include Logic for Selective Service Redirection for Telecom Service Migration (LSSRTSM) 147. LSSRTSM 147 includes code for implementing the processes described below, including those described in FIGS. 2-5. In one embodiment, computer 101 is able to download LSSRTSM 147 from software deploying server 149, including in an on-demand basis, wherein the code in LSSRTSM 147 is not downloaded until needed for execution. In one embodiment of the present invention, software deploying server 149 performs all of the functions associated with the present invention (including execution of LSSRTSM 147), thus freeing computer 101 from having to use its own internal computing resources to execute LSSRTSM 147.

Also within computer 101 is a location sensor 153, which is able to detect the physical location of computer 101. For example, location and positioning sensor 153 may incorporate global positioning system (GPS) sensors that identify the geophysical location of computers using signals from an array of space-based GPS satellites. Furthermore, location sensor 153 may use the distance and angular orientation between any two electronic transceivers (e.g., by detecting Doppler shifts, signal bounce-back timing, etc.) to detect the location and distance from one electronic device to another electronic device.

Computer 101 is also able to communicate with an enterprise network, such as a telecom (telecommunications) system 151. Examples of telecom system include, but are not limited to, a dedicated service line (DSL) phone line, a cellular phone system, a Voice over Internet Protocol (VoIP) telecommunications system, a hardware-based private branch exchange (PBX) phone system, etc.

Computer 101 is also able to access resources (including cloud-based resources), such as a resource pool 155, which may use electronically deliverable resources (e.g., services such as VoIP enabling software and configuration messages) and/or electronic order messages for the delivery of hardware components to the system.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

One or more embodiments of the present invention provide a method and/or apparatus for the selective redirection of legacy service order requests in a telecom (telecommunications) order management system to equivalent Internet Protocol (IP) based services (e.g., VoIP telecom services) using selective redirection. Selective redirection works in a less disruptive, more gradual approach. In selective redirection every individual service order is examined to see if the specific service order can be substituted by an IP equivalent service. This approach allows an operator to gradually move specific order types over to the new IP services on an individual per order basis, without affecting other orders in the system.

Figure 2:
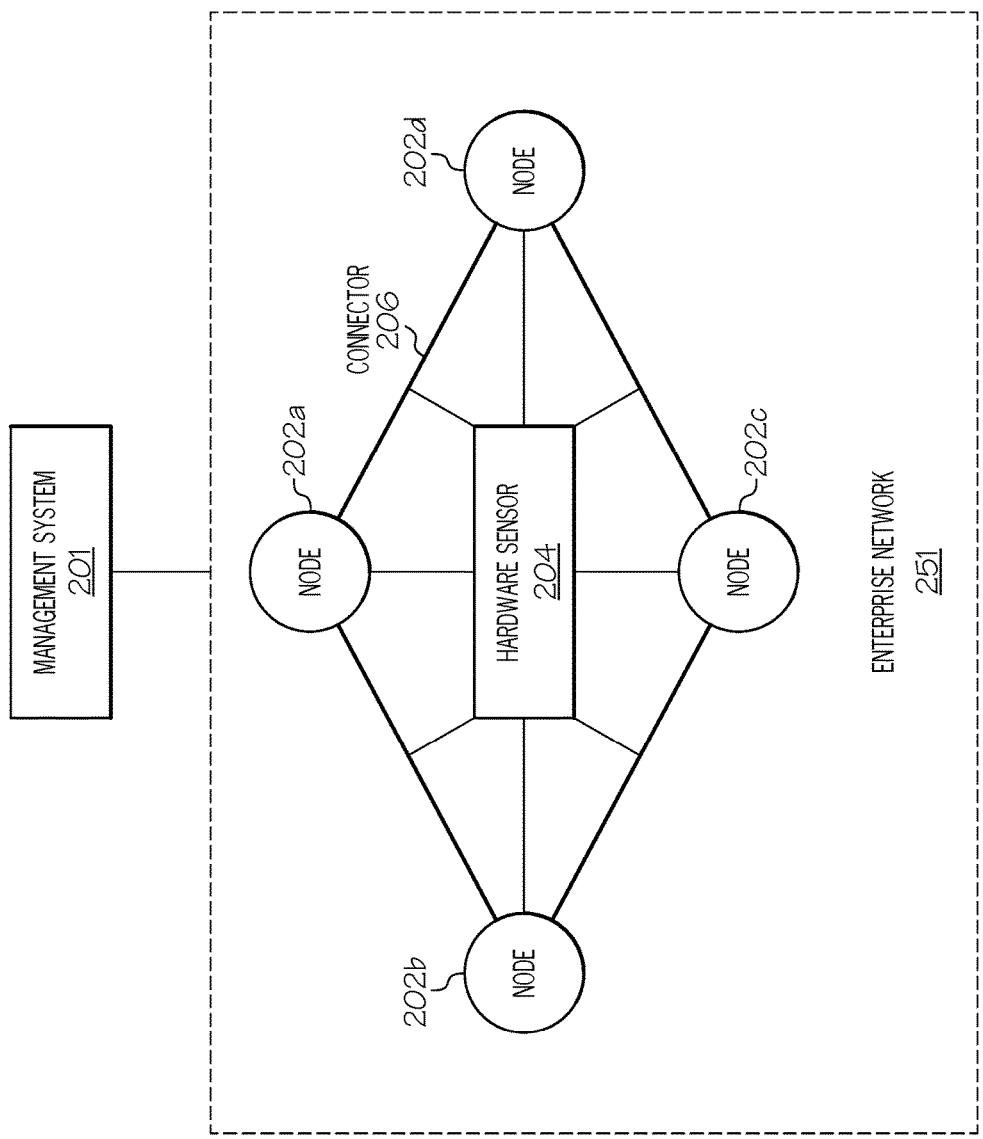
FIG. 2 illustrates an exemplary management system coupled to an enterprise network in accordance with one or more embodiments of the present invention.

With reference now to FIG. 2, assume that management system 201 (equivalent to computer 101 shown in FIG. 1) is monitoring, managing, configuring, etc. an enterprise network 251 (e.g., the telecom system 151 shown in FIG. 1). Assume that enterprise network 251 includes multiple nodes 202a-202d (which may be more or fewer than the four nodes 202 shown in FIG. 2). Nodes 202a-202d may be telecom routers, trunk switches, branch exchanges, and/or end use devices (e.g., phones, facsimile machines, servers, etc.). Nodes 202a-202d are connected to one another by connectors (e.g., fiber optic lines, wires, busses, cell towers, etc.) such as the depicted connector 206 shown communicatively connecting node 202a to node 202d in FIG. 2.

Hardware sensor 204 is a hardware device that monitors activity in nodes 202a-202d and/or their interconnections (e.g., connector 206). That is, hardware sensor 204 is a hardware device that monitors communication traffic on the interconnections such as connector 206, the hardware and/or software components of the nodes 202a-202d (e.g., the speed of, amount of resources within, etc. the nodes 202a-202d), etc. As such, hardware sensor 204 is able to provide information to the management system 201 that allows the management system 201 to determine if legacy components in the enterprise network 251 can be replaced with more modern components (e.g., VoIP systems replacing an old private branch exchange (PBX) system).

Figure 3:
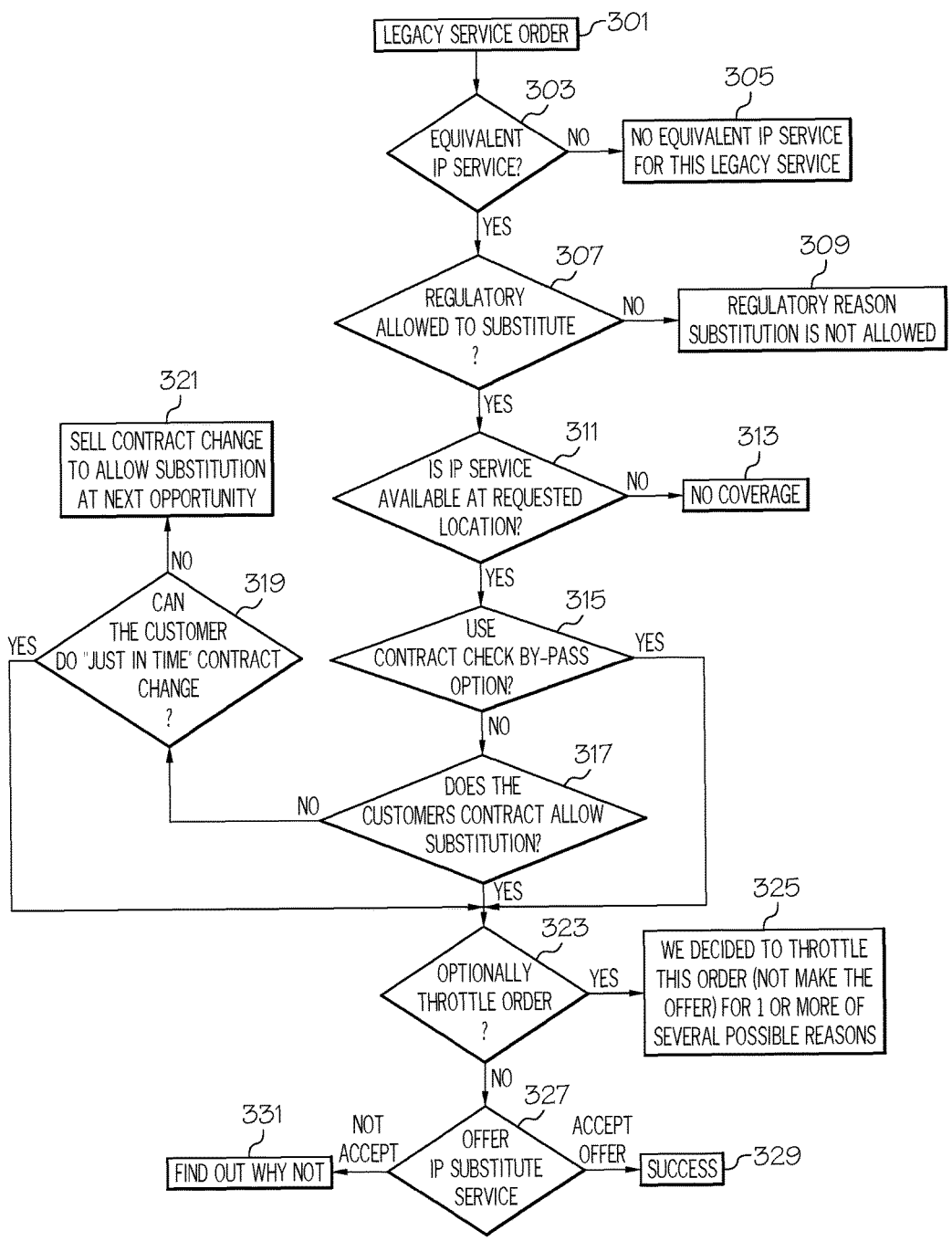
FIG. 3 is a high-level flow chart of one or more steps performed by one or more processors to respond to a legacy service order in accordance with one or more embodiments of the present invention.

With reference now to FIG. 3, a high-level flow chart of one or more steps performed by one or more processors to respond to a legacy service order in accordance with one or more embodiments of the present invention is presented.

As shown in initiator block 301, a legacy service order is received for a Centrex telecom system, a PBX system, a dedicated service line (DSL) system, etc. for a new/replacement component. For example, the legacy service order may be an order for a replacement DSL router, a replacement PBX switchboard, etc. to replace and/or augment existing legacy components in the legacy system.

However, as shown in query block 303, the recipient of the legacy service order described in block 301 will determine whether or not a more modern and strategically equivalent IP service is available. For example, the management system 201 shown in FIG. 2 will determine if there is an IP service that provides the same features (and preferably other features, as well) that the legacy system (e.g., a PBX system) has been providing. If there are no strategically equivalent IP services in existence (or at least available to the recipient of the legacy service order), as shown in block 305, then an analytic report will be generated stating that no such strategically equivalent IP services exist.

That is, as described in block 303, a table (or series of tables) that contains a list of legacy services and their equivalent IP services is examined. Each entry in the legacy service table can have a service type as well as various options and configurations that can be ordered, each with its mapping to an equivalent IP service.

As shown in block 305, if there is no IP equivalent service for this legacy service order, then an analytic metric (e.g., report) is produced and the order allowed to go through as a legacy service order.

However, if there are such strategically equivalent IP services in existence, then a query/check is performed to determine whether or not there is a regulatory reason why this customer cannot substitute the legacy service with the new strategically equivalent IP service, as shown in block 307. For example, assume that an air traffic controller uses the legacy service, and that governmental regulations require that such systems be inaccessible to IP hacks. As such, this system would not be allowed to use the new strategically equivalent IP service. As described in block 309, since there is a regulatory reason why substitution is not allowed for this customer, an analytic metric is produced and the order allowed to go through as a legacy service order.

If there is no regulatory prohibition against the use of IP services (query block 307), then a check is made to make sure that the equivalent IP service is available at the location where the legacy service has been requested, as shown in query block 311. For example, the IP service may require a VoIP fiber cable, which may or may not be available in the location of the legacy system. Thus, if the IP service is not available at the requested location (query block 311), then an analytics metric is produced showing that the legacy service could not be substituted with the IP equivalent service because of a lack of coverage area by the new IP service (block 313).

If the IP service is available in the area of the legacy system (query block 311), then a contract bypass option is tested (query block 315). The user contract bypass option is a test (or option) to decide to check (or not) if the customer's current contract allows substitution of legacy services with strategic services. That is, if this user contract bypass option exists for the customer that sent the legacy service order, then the recipient of the legacy service order can substitute the IP service for the requested legacy service without obtaining permission from the customer. Thus, the recipient of the legacy service order, depending upon the service and how it wants to handle the issue of updating contracts to allow substitution, may choose to check the contract in this system or let another system deal with updating the contract if the customer decides to accept the substitution of the legacy service with its IP equivalent service. This test allows the recipient of the legacy service order to implement both approaches when dealing with the potential need to update a customer contract if they decide to substitute the legacy service with its IP equivalent.

If the user contract bypass option does not exist for the customer that sent the legacy service order (i.e., the substitution can be made automatically), then the customer may decide to accept the updated IP system (query block 317). That is, the recipient of the legacy service order will check the customer's contract to see if legacy services can be substituted with IP services. If the customer's contract does not allow such a substitution (query block 317), then a query is made to determine if a "just in time" contract modification or addendum to the existing contract can be made, or a new contract can be issued, in order to allow substitution of the requested legacy system for the IP system, as shown in query block 319.

If the contract cannot be altered or replaced (query block 319), then the recipient of the legacy service order will produce an analytic metric (describing the inability to alter the original contract) and will move on to the sell contract change at next opportunity box shown in block 321. The "Sell Contract Change" depicted in block 321 directs the recipient of the legacy service order to allow this legacy service order to go through, but to flag the customer for a sales team to follow up with at a later date (e.g., when the existing contract expires and is up for renewal), since the current legacy service order could have been satisfied with an IP service had the current contract allowed it, or had the person placing the service order been contractually allowed to make the decision to substitute an IP service for the legacy system (e.g., a time division multiplexing (TDM) legacy service).

With reference now to block 323, the optionally throttle order is a governor that can be used to reduce or control how many IP substitutions are offered. For various reasons the service provider may not want to redirect every legacy service order over to its IP equivalent. Thus, a governor (limiter) is used in order to allow the service provider to offer some percentage of orders at block 325. Exemplary reasons why the service provider may want to limit offers to substitute a legacy service order with its IP equivalent include (but are not limited to): 1) the customer has less than "x" months before their contract expires; 2) the customer has a "high" propensity to churn (e.g., frequently switch service providers), where "high" is any predetermined value for a propensity to churn metric that would be obtained from an external analytics system; 3) the service provider wants to set a rate (or hard limit) for the rate of substitution. This is a percentage of orders to substitute with their strategic equivalents. The percentage can range from 0% (meaning "never substitute a legacy service with its IP equivalent") to 100% (meaning "always offer the customer the option to substitute a legacy service with its IP equivalent"); 4) a customer is on (or has requested to be on) a list of customers for which legacy services are moved to IP services whenever possible; 5) a service is close to Sunset (i.e., the legacy service is about to be withdrawn, no longer supported, etc.) so all legacy orders for this service should be substituted with their IP equivalents; 6) the customer already has a high number or percentage of IP services; and/or 7) the customer has given low sentiment scores or has had some recent bad experience(s) with the operator. If the customer has had some recent bad experience(s) with the legacy service, then the service provider may recommend moving the customer to the new IP based equivalent service. If there have been reports of issues with the IP based service in a geographic area, the service provider may reduce the number of strategic service redirections in a region until the outstanding issues are resolved or more positive customer sentiment for the IP based service is received.

These analytical steps produce analytics as well as a result (or decision) to use the throttle and to make (or to not make) the offer.

As shown in block 327 (the "Offer IP substitute service" box), if there is no optionally throttle order, then the service provider will offer to the customer the new IP service that can be used instead of the legacy service. The service provider may choose to add some bundles and other incentives with the equivalent IP service to help motivate the customer to choose the IP service. Examples of such incentives include, but are not limited to, bundling video calls with an IP voice line, adding a Wi-Fi router with an IP data service, etc.

The process described in block 327 can be implemented using one of three exemplary approaches: 1) Fully Automated, in which the order is just redirected to the strategic service fulfillment system; 2) Semi-automated, which is a "self-service" approach that uses a portal or user interface where the offer is made and the user (or customer) is allowed to choose (or not) to substitute the service with its strategic equivalent; and 3) Manually Implemented, where the customer and substitute order details are passed to a sales person as a potential lead allowing the sales person to make the offer.

The decisions to automatically or manually make the offer can depend on a variety of factors such as the geographic region, the services (legacy or IP substitute) involved, corporate policy, etc. No matter how this step is implemented, the result of the step is that the customer decides if they want to accept or reject the substitute IP service (block 329).

The "find out why not box" (block 331) means that the service provider allows the legacy (e.g., TDM) service order go through, but tries to find out why the customer did not want or accept the new equivalent IP service. Some of the reasons for such a refusal include, but are not limited to: 1) the IP Service will take too long to install; 2) the customer simply wants to stick with the old services because of his/her familiarity with them (thus requiring no retraining costs); 3) the customer does not want to buy/lease any new equipment; 4) the customer is concerned that other legacy equipment (e.g., old facsimile machines) will not work with the new IP service; 5) the customer has received unfavorable reviews about the new IP service; 6) the customer does not believe that the new IP service will be cheaper; and/or 7) the customer representative who sent the legacy service order is not the person who can make the decision to switch over to an IP service.

Figure 4:
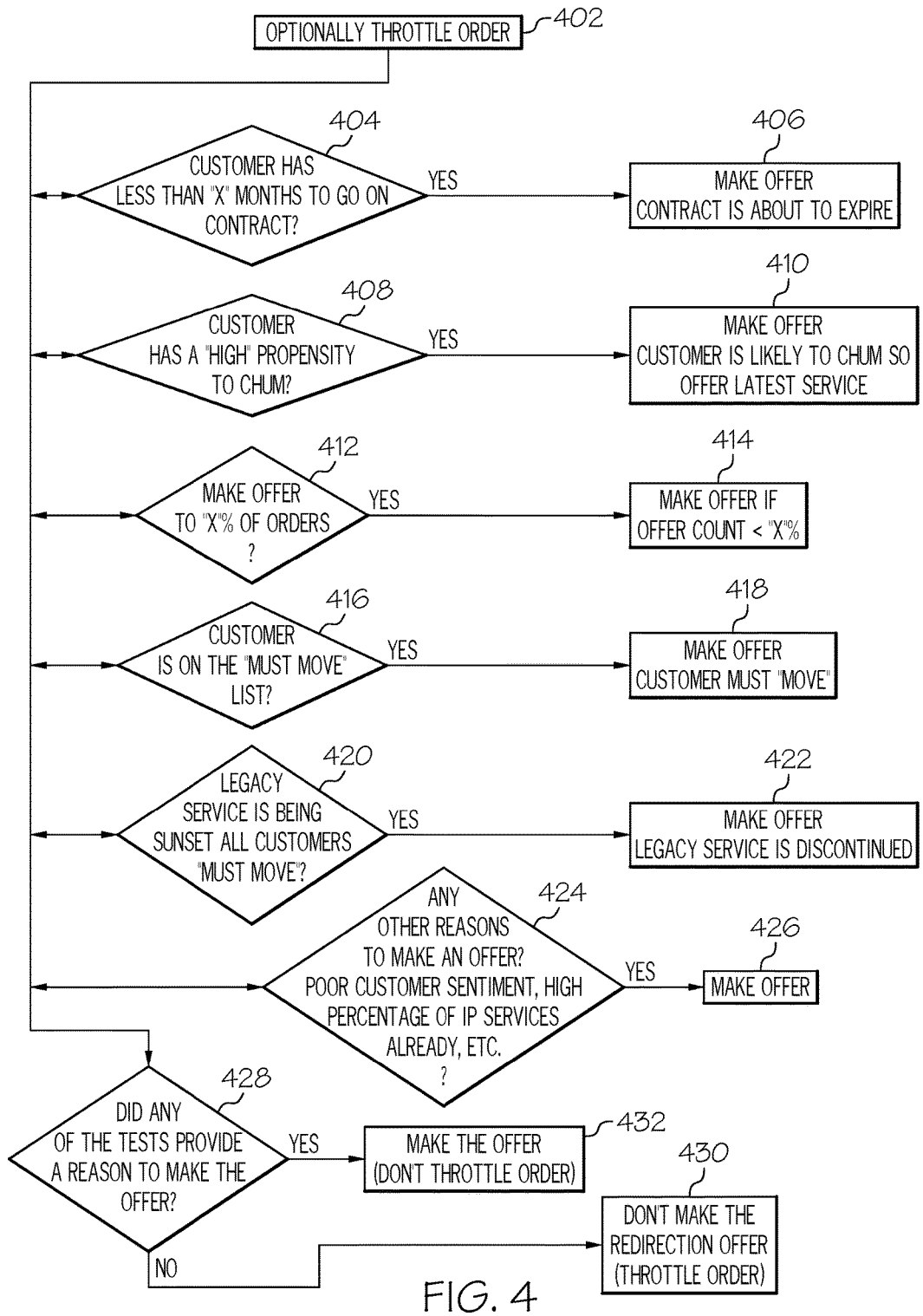
FIG. 4 is a high-level flow chart of one or more steps performed by one or more processors to handle a legacy service order governor in accordance with one or more embodiments of the present invention.

With reference now to FIG. 4, a high-level flow chart of one or more steps performed by one or more processors to handle a legacy service order governor in accordance with one or more embodiments of the present invention is presented.

As shown in block 402, an optionally throttle order exists (see block 323 in FIG. 3) for the customer who has sent the legacy service order (see block 301 in FIG. 3).

As described in query block 404, if the customer is on a legacy system contract that is about to expire, then the IP service provider will offer that customer the IP service upgrade (block 406).

As described in query block 408, if the customer has a history of switching among service providers, then the IP service provider will offer that customer the IP service upgrade (block 410), in an attempt to retain his/her business.

As described in query block 412, if the IP service provider has not offered the new IP service to a predetermined percentage of customers, then the IP service provider will offer that customer the IP service upgrade (block 414).

As described in query block 416, if a particular customer is on a list of customers who "must move" to an IP system (as determined by the customer himself), then the IP service provider will offer that customer the IP service upgrade (block 418).

As described in query block 420, if the service provider determines that the customer requesting the legacy service "must move" to an IP system, then the service provider will move that customer to the IP service upgrade (block 422).

As described in query block 424, if there is any other compelling reason to move the customer to the IP service (e.g., poor customer sentiment, having a high percentage of existing IP services, etc.), then the service provider will offer that customer the IP service upgrade (block 426).

As described in block 428, if none of the factors just described provide a reason to offer the IP service upgrade, then the legacy order will be filled and not replaced with the IP service substitute (block 430). However, if any of the factors just described did provide a reason to offer the IP service upgrade, then the offer is made without regard to any throttling (block 432).

Figure 5:
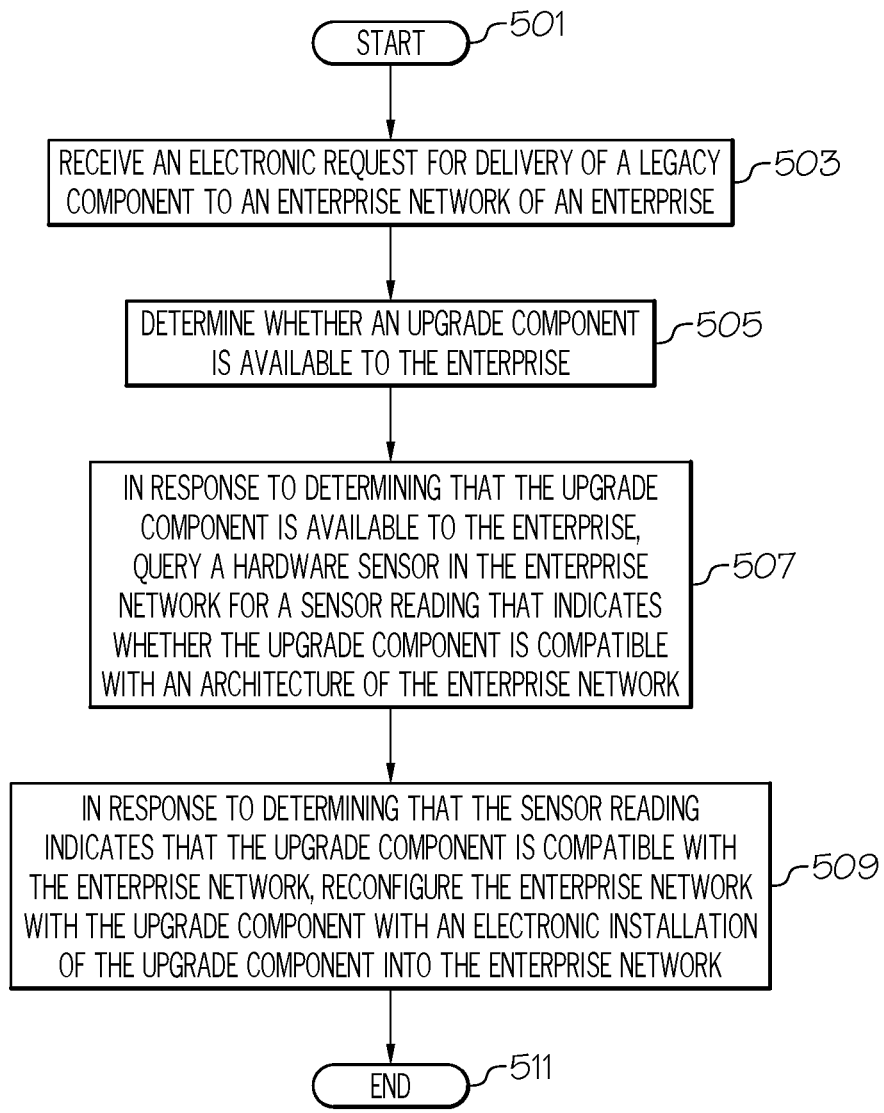
FIG. 5 is a high-level flow chart of one or more steps performed by one or more processors to improve an operation of an enterprise network in accordance with one or more embodiments of the present invention.

With reference now to FIG. 5, a high-level flow chart of one or more steps performed by one or more processors to improve an operation of an enterprise network in accordance with one or more embodiments of the present invention is presented.

After initiator block 501, one or more processors (e.g., with management system 201 shown in FIG. 2) receive an electronic request for delivery of a legacy component (e.g., a legacy TDM switching system) to an enterprise network (e.g., enterprise network 251 shown in FIG. 2) that is owned/leased/used by an enterprise (e.g., a "customer"), as described in block 503.

As described in block 505, the processor(s) determine whether an upgrade component is available to the enterprise, where the upgrade component is designed to replace the legacy component in the enterprise network, and where availability of the upgrade component is based on predetermined request throttling parameters set by a receiver of the electronic request (as described above in FIG. 3 and FIG. 4).

As described in block 507 of FIG. 5, the processor(s), in response to determining that the upgrade component is available to the enterprise, query a hardware sensor (e.g., hardware sensor 204 shown in FIG. 2) in the enterprise network for a sensor reading, where the sensor reading indicates whether the upgrade component is compatible with an architecture of the enterprise network (e.g., whether it is compatible with the hardware/software in nodes 202a-202d and/or their connectors shown in FIG. 2).

As described in block 509 of FIG. 5, the processor(s), in response to determining that the sensor reading indicates that the upgrade component is compatible with the enterprise network, reconfigure the enterprise network with the upgrade component by responding to the electronic request with an electronic installation of the upgrade component into the enterprise network. That is, the upgrade (e.g., from a legacy TDM system to a VoIP system) is achieved by providing the enterprise network to channels/services that enable the upgrade. For example, if the enterprise network 251 shown in FIG. 2 was to upgrade to a VoIP system, then the management system 201 would open up a connection from the enterprise network 251 to the Internet (not shown in FIG. 2), which would enable the enterprise network 251 to start using VoIP.

The flow-chart shown in FIG. 5 ends at terminator block 511.

In an embodiment of the present invention as described herein, the enterprise network is a telecommunications network, the upgrade component is a replacement Internet Protocol (IP) based component, and the method further comprises: selectively replacing, by one or more processors, the legacy component with the replacement IP based component based on a replacement rule, where the replacement rule describes whether a customer's contract permits IP service substitution at a location of the legacy component.

In an embodiment of the present invention as described herein, the enterprise network is a telecommunications network, the upgrade component is a replacement Internet Protocol (IP) based component, and the method further comprises: requesting, by one or more processors, permission from the telecommunications network to replace the legacy component with the replacement IP based component; and in response to receiving the permission, replacing, by one or more processors, the legacy component with the replacement IP based component.

In an embodiment of the present invention as described herein, the enterprise network is a telecommunications network, the upgrade component is a replacement Internet Protocol (IP) based component, and the method further comprises: generating, by one or more processors, analytics that describe which telecommunications networks are allowed to replace the legacy component with the upgrade component; and modifying, by one or more processors, the reconfiguring of the telecommunications network based on these analytics.

In an embodiment of the present invention as described herein, the enterprise network is a telecommunications network, the upgrade component is a replacement Internet Protocol (IP) based component, and the method further comprises: generating, by one or more processors, analytics that describe service coverage areas in which the replacement IP based component is available; and modifying, by one or more processors, the reconfiguring of the telecommunications network based on these analytics.

In an embodiment of the present invention as described herein, the enterprise network is a telecommunications network, the upgrade component is a replacement Internet Protocol (IP) based component, and the method further comprises: generating, by one or more processors, analytics that identify a service coverage area in which the replacement IP based component is unavailable; and upgrading, by one or more processors, the service coverage area with the replacement IP based component.

In an embodiment of the present invention as described herein, the enterprise network is a telecommunications network, the upgrade component is an equivalent Internet Protocol (IP) based component that performs an equivalent function as the legacy component, and the method further comprises: determining, by one or more processors, that the equivalent IP based component does not exist; in response to determining that the equivalent IP based component does not exist, creating, by one or more processors, the equivalent IP based component; and installing, by one or more processors, the equivalent IP based component in the telecommunications network.

In an embodiment of the present invention as described herein, the enterprise network is a telecommunications network, the upgrade component is a replacement Internet Protocol (IP) based component, and the method further comprises: generating, by one or more processors, analytics that identify a percentage of unsuccessful prior reconfigurations of the telecommunications network with the replacement IP based component; and in response to determining that the percentage of unsuccessful prior reconfigurations exceeds a predetermined value, blocking, by one or more processors, the electronic installation of the replacement IP based component in the telecommunications network.

The present invention may be implemented in one or more embodiments using cloud computing. Nonetheless, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
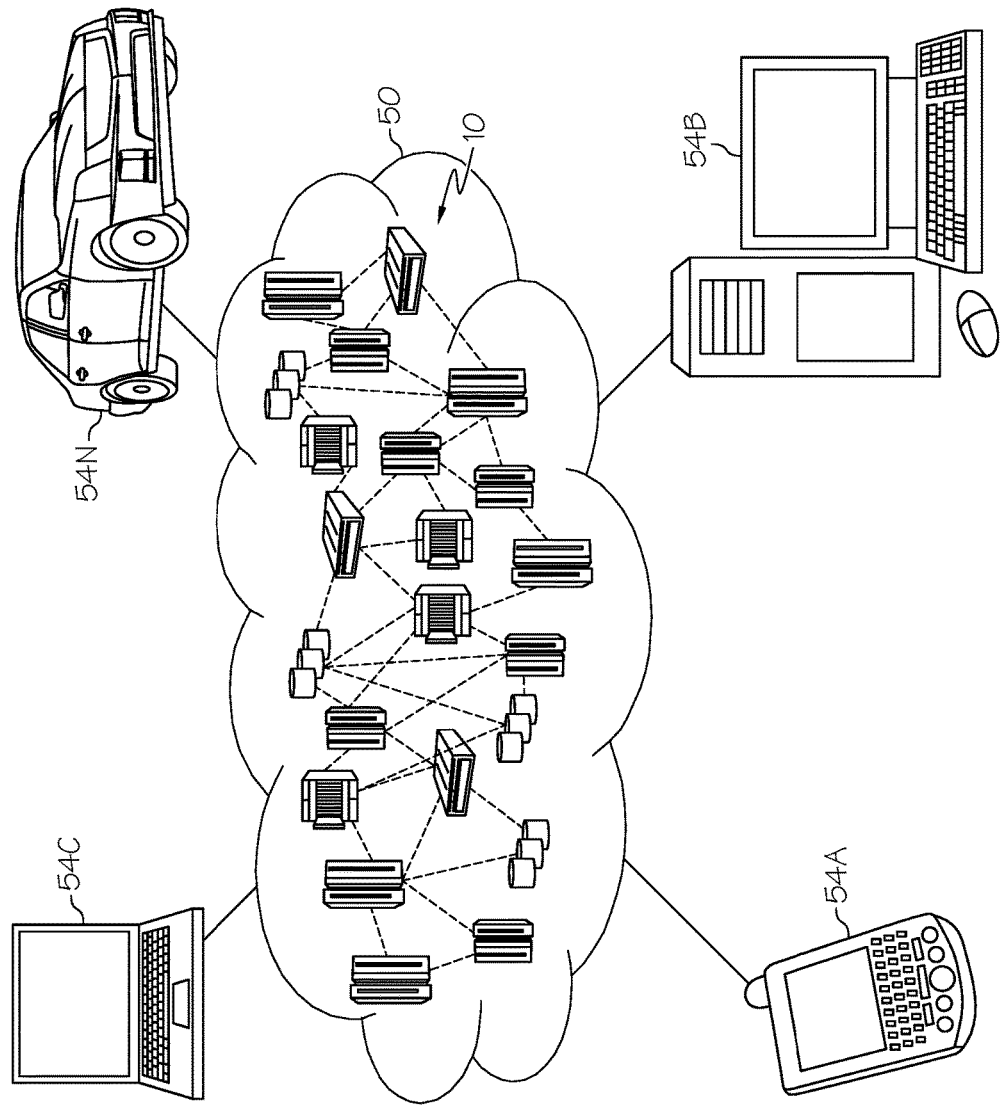
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 6 are intended to be illustrative only and that computing nodes 10 and cloud computing environment 50 can communicate with any type of computerized device over any type of network and/or network addressable connection (e.g., using a web browser).

Figure 7:
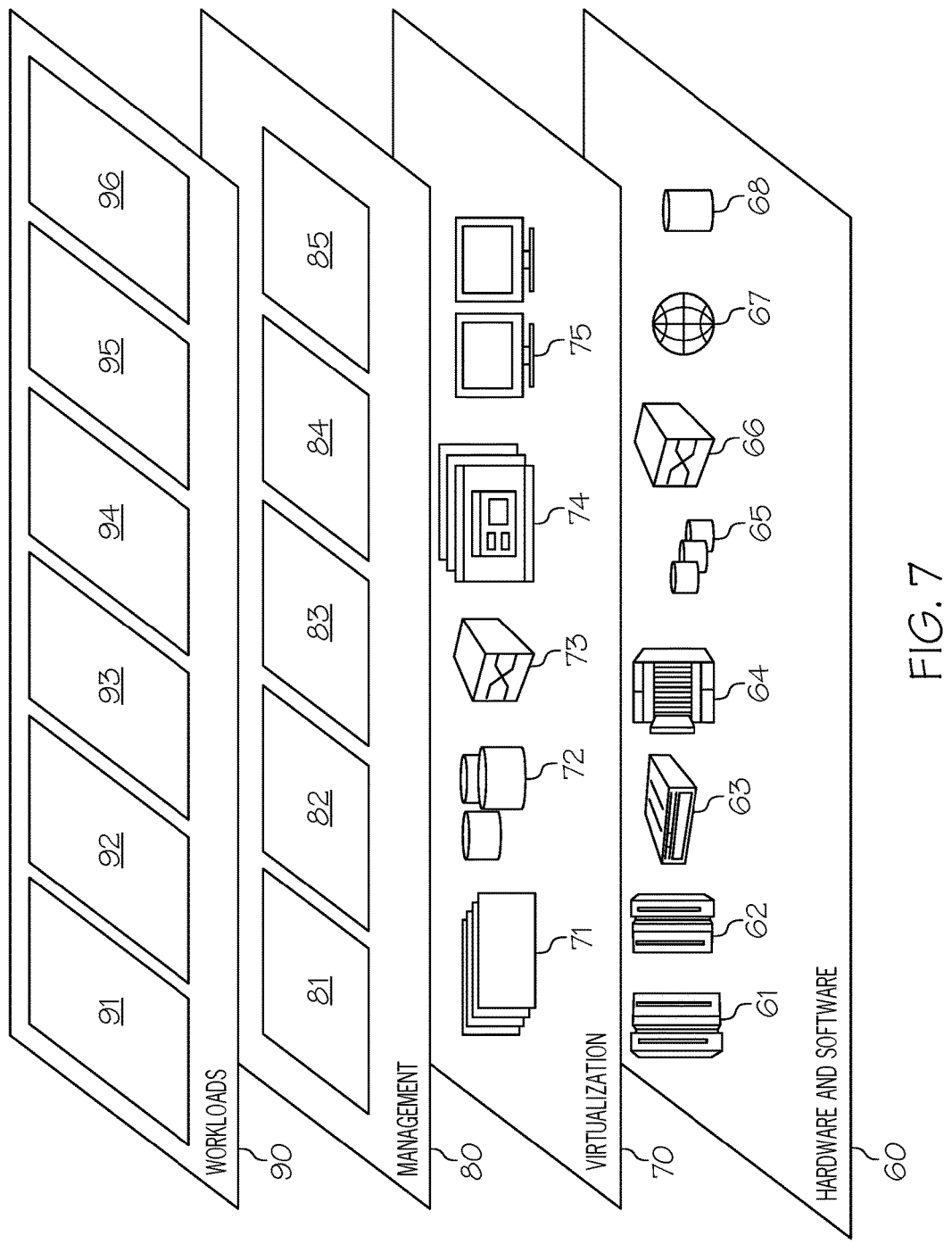
FIG. 7 depicts abstraction model layers of a cloud computer environment according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and selective service redirection processing 96, which performs one or more functions described for the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:

receiving, by one or more processors, an electronic request for delivery of a legacy component to an enterprise network of an enterprise;

determining, by one or more processors, whether an upgrade component is available to the enterprise, wherein the upgrade component is designed to replace the legacy component in the enterprise network, wherein availability of the upgrade component is based on predetermined request throttling parameters set by a receiver of the electronic request, and wherein the enterprise network is a telecommunications network, wherein the upgrade component is a replacement Internet Protocol (IP) based component;

in response to determining that the upgrade component is available to the enterprise, querying, by one or more processors, a hardware sensor in the enterprise network for a sensor reading, wherein the sensor reading indicates whether the upgrade component is compatible with an architecture of the enterprise network; and in response to determining that the sensor reading indicates that the upgrade component is compatible with the enterprise network, reconfiguring, by one or more processors, the enterprise network with the upgrade component by responding to the electronic request with an electronic installation of the upgrade component into the enterprise network by selectively replacing, by one or more processors, the legacy component with the replacement IP based component based on a replacement rule, wherein the replacement rule describes whether a customer's contract permits IP service substitution at a location of the legacy component.

2. The method of claim 1, further comprising:

requesting, by one or more processors, permission from the telecommunications network to replace the legacy component with the replacement IP based component; and in response to receiving the permission, replacing, by one or more processors, the legacy component with the replacement IP based component.

3. The method of claim 1, further comprising:

generating, by one or more processors, analytics that describe which telecommunications networks are allowed to replace the legacy component with the upgrade component; and modifying, by one or more processors, said reconfiguring of the telecommunications network based on said analytics.

4. The method of claim 1, further comprising:

generating, by one or more processors, analytics that describe service coverage areas in which the replacement IP based component is available; and modifying, by one or more processors, said reconfiguring of the telecommunications network based on said analytics.

5. The method of claim 1, further comprising:

generating, by one or more processors, analytics that identify a service coverage area in which the replacement IP based component is unavailable; and upgrading, by one or more processors, the service coverage area with the replacement IP based component.

6. The method of claim 1, further comprising:

determining, by one or more processors, that an equivalent IP based component does not exist, wherein the equivalent IP based component is equivalent to the replacement IP based component;

in response to determining that the equivalent IP based component does not exist, creating, by one or more processors, the equivalent IP based component; and installing, by one or more processors, the equivalent IP based component in the telecommunications network.

7. The method of claim 1, further comprising:

generating, by one or more processors, analytics that identify a percentage of unsuccessful prior reconfigurations of the telecommunications network with the replacement IP based component; and in response to determining that the percentage of unsuccessful prior reconfigurations exceeds a predetermined value, blocking, by one or more processors, the electronic installation of the replacement IP based component in the telecommunications network.

8. A computer program product comprising one or more computer readable storage mediums, and program instructions stored on at least one of the one or more storage mediums, the stored program instructions comprising:

program instructions to receive an electronic request for delivery of a legacy component to an enterprise network of an enterprise;

program instructions to determine whether an upgrade component is available to the enterprise, wherein the upgrade component is designed to replace the legacy component in the enterprise network, wherein availability of the upgrade component is based on predetermined request throttling parameters set by a receiver of the electronic request, and wherein the enterprise network is a telecommunications network, wherein the upgrade component is a replacement Internet Protocol (IP) based component;

program instructions to, in response to determining that the upgrade component is available to the enterprise, query a hardware sensor in the enterprise network for a sensor reading, wherein the sensor reading indicates whether the upgrade component is compatible with an architecture of the enterprise network; and program instructions to, in response to determining that the sensor reading indicates that the upgrade component is compatible with the enterprise network, reconfigure the enterprise network with the upgrade component by responding to the electronic request with an electronic installation of the upgrade component into the enterprise network by selectively replacing, by one or more processors, the legacy component with the replacement IP based component based on a replacement rule, wherein the replacement rule describes whether a customer's contract permits IP service substitution at a location of the legacy component.

9. The computer program product of claim 8, further comprising:

program instructions to request permission from the telecommunications network to replace the legacy component with the replacement IP based component; and program instructions to, in response to receiving the permission, replace the legacy component with the replacement IP based component.

10. The computer program product of claim 8, further comprising:

program instructions to generate analytics that describe which telecommunications networks are allowed to replace the legacy component with the upgrade component; and program instructions to modify said reconfiguring of the telecommunications network based on said analytics.

11. The computer program product of claim 8, further comprising:
program instructions to generate analytics that describe service coverage areas in which the replacement IP based component is available; and
program instructions to modify said reconfiguring of the telecommunications network based on said analytics.

12. The computer program product of claim 8, further comprising:
program instructions to generate analytics that identify a service coverage area in which the replacement IP based component is unavailable; and
program instructions to upgrade the service coverage area with the replacement IP based component.

13. The computer program product of claim 8, further comprising:
program instructions to determine that an equivalent IP based component does not exist, wherein the equivalent IP based component is equivalent to the replacement IP based component;
program instructions to, in response to determining that the equivalent IP based component does not exist, create the equivalent IP based component; and
program instructions to install the equivalent IP based component in the telecommunications network.

14. The computer program product of claim 8, further comprising:
program instructions to generate analytics that identify a percentage of unsuccessful prior reconfigurations of the telecommunications network with the replacement IP based component; and
program instructions to, in response to determining that the percentage of unsuccessful prior reconfigurations exceeds a predetermined value, block the electronic installation of the replacement IP based component in the telecommunications network.

15. A computer system comprising one or more processors, one or more computer readable memories, and one or more computer readable storage mediums, and program instructions stored on at least one of the one or more computer readable storage mediums for execution by at least one of the one or more processors via at least one of the one or more computer readable memories, the stored program instructions comprising:
program instructions to receive an electronic request for delivery of a legacy component to an enterprise network of an enterprise;
program instructions to determine whether an upgrade component is available to the enterprise, wherein the upgrade component is designed to replace the legacy component in the enterprise network, wherein availability of the upgrade component is based on predetermined request throttling parameters set by a receiver of the electronic request, and wherein the enterprise network is a telecommunications network, wherein the upgrade component is a replacement Internet Protocol (IP) based component;
program instructions to, in response to determining that the upgrade component is available to the enterprise, query a hardware sensor in the enterprise network for a sensor reading, wherein the sensor reading indicates whether the upgrade component is compatible with an architecture of the enterprise network; and
program instructions to, in response to determining that the sensor reading indicates that the upgrade component is compatible with the enterprise network, reconfigure the enterprise network with the upgrade component by responding to the electronic request with an electronic installation of the upgrade component into the enterprise network by selectively replacing, by one or more processors, the legacy component with the replacement IP based component based on a replacement rule, wherein the replacement rule describes whether a customer's contract permits IP service substitution at a location of the legacy component.

16. The computer system of claim 15, further comprising:
program instructions to request permission from the telecommunications network to replace the legacy component with the replacement IP based component; and
program instructions to, in response to receiving the permission, replace the legacy component with the replacement IP based component.

17. The computer system of claim 15, further comprising:
program instructions to generate analytics that describe which telecommunications networks are allowed to replace the legacy component with the upgrade component; and
program instructions to modify said reconfiguring of the telecommunications network based on said analytics.

\* \* \* \* \*